(12) United States Patent  (10) Patent No.: US 8,121,088 B2
Kim et al.  (45) Date of Patent: Feb. 21, 2012

(54) METHOD AND APPARATUS FOR PERFORMING DATA COMMUNICATION IN MOBILE COMMUNICATION TERMINAL

(75) Inventors: Min Chul Kim, Gumi-si (KR); Chang Taek Kang, Gumi-si (KR)

(73) Assignee: Samsung Electronics Co., Ltd., Yeongtong-Gu, Suwon-Si, Gyeonggi-Do (KR)

( * ) Notice: Subject to any disclaimer, the term of this patent is extended or adjusted under 35 U.S.C. 154(b) by 1058 days.

(21) Appl. No.: 11/890,723

(22) Filed: Aug. 7, 2007

(65) Prior Publication Data

US 2008/0080417 A1  Apr. 3, 2008

(30) Foreign Application Priority Data

Sep. 29, 2006 (KR) .................. 10-2006-0095341

(51) Int. Cl.
*H04W 4/00* (2009.01)
*H04W 36/00* (2009.01)

(52) U.S. Cl. ............ 370/331; 455/432.1; 455/438; 455/439

(58) Field of Classification Search .......... 370/328, 370/331; 455/432.1, 436, 438, 439

See application file for complete search history.

(56) References Cited

U.S. PATENT DOCUMENTS

| 5,574,775 | A | * | 11/1996 | Miller et al. | 455/444 |
|---|---|---|---|---|---|
| 6,633,761 | B1 | | 10/2003 | Singhal et al. | 455/436 |
| 7,539,169 | B1 | * | 5/2009 | O'Hara et al. | 370/338 |
| 2002/0094013 | A1 | * | 7/2002 | Schilling et al. | 375/130 |
| 2003/0148765 | A1 | * | 8/2003 | Ma et al. | 455/438 |
| 2005/0153705 | A1 | * | 7/2005 | Gramakov et al. | 455/456.1 |
| 2005/0286470 | A1 | * | 12/2005 | Asthana et al. | 370/331 |
| 2006/0120329 | A1 | * | 6/2006 | Kim et al. | 370/331 |
| 2006/0123064 | A1 | * | 6/2006 | Kim et al. | 707/201 |
| 2007/0254659 | A1 | * | 11/2007 | Paul et al. | 455/436 |

FOREIGN PATENT DOCUMENTS

| KR | 2005-66286 | 6/2005 |
|---|---|---|
| KR | 2006-7740 | 1/2006 |
| KR | 2006-37703 | 5/2006 |
| KR | 2006-39563 | 5/2006 |

* cited by examiner

*Primary Examiner* — Ronald Abelson

(74) *Attorney, Agent, or Firm* — Cha & Reiter, LLC

(57) ABSTRACT

Disclosed are a method and apparatus for performing communication in a mobile communication terminal. The method includes determining the type of the communication when the mobile communication terminal exits from a WiBro service area while performing the communication using a WiBro network, receiving, if the communication is data communication, an input of a data communication method and continuing to perform or terminating the data communication according to the input data communication method.

11 Claims, 4 Drawing Sheets

METHOD AND APPARATUS FOR PERFORMING DATA COMMUNICATION IN MOBILE COMMUNICATION TERMINAL

CLAIMS OF PRIORITY

This application claims the benefit of the earlier filing date, pursuant to 35 USC 119, to that patent application entitled "METHOD AND APPARATUS FOR PERFORMING DATA COMMUNICATION IN MOBILE COMMUNICATION TERMINAL" filed in the Korean Intellectual Property Office on Sep. 29, 2006 and assigned Serial No. 2006-0095341, the contents of which are incorporated herein by reference.

BACKGROUND OF THE INVENTION

1. Field of the Invention

The present invention relates to a mobile communication terminal, and more particularly, to a method and apparatus for performing data communication in a mobile communication terminal having a Wireless Broadband (WiBro) communication function.

2. Description of the Related Art

Recently, users of mobile communication terminals have access to a Wireless Application Protocol (WAP) service to receive data such as game data, photos, motion videos, or MP3 files.

However, WAP services using currently available mobile communication networks suffer low transmission rates and inconvenient user interface problems. Another drawback is that the WAP services impose a high economic burden on users when downloading large amounts of data because data communication costs are charged on a packet-by-packet basis. On the other hand, a new wireless broadband Internet technology (WiBro) is being developed by the Korean telecoms industry to overcome the problems in WAP. WiBro adapts TDD for duplexing, OFDMA for multiple access and 8.75 MHz as a channel bandwidth.

WiBro services offer increased transmission rate and reduced data communication costs compared to WAP services, however they suffer increased data communication costs when data communications are automatically handed over from a WiBro network to a public wireless network due to a mobile communication terminal being located outside its service area.

SUMMARY OF THE INVENTION

In order to solve the above problems, the present invention discloses a method and apparatus for performing data communication in a mobile communication terminal that permit data communication to be suspended when the mobile communication terminal exits from a WiBro service area while performing the data communication using a WiBro network, thus resulting in a reduction in data communication costs.

Another aspect of the present invention discloses a method and apparatus for performing data communication in a mobile communication terminal using a WiBro network that allow suspended data communication to continue when the mobile communication terminal reenters the WiBro service area.

According to an exemplary embodiment of the present invention, there is provided a method for performing communication in a mobile communication terminal, including determining the type of the communication when the mobile communication terminal exits from a WiBro service area while performing the communication using a WiBro network, receiving, if the communication is data communication, an input of a data communication method and continuing to perform or terminating the data communication according to the input data communication method.

In accordance with another exemplary embodiment of the present invention, there is provided a mobile communication terminal having a WiBro function, including a WiBro communication unit for receiving a WiBro signal from a WiBro base station and performing data communication using a WiBro network when the mobile communication terminal enters a WiBro service area, a controller for sensing the WiBro signal received from the WiBro communication unit to determine whether the mobile communication terminal exits from or enters the WiBro service area, a public wireless communication unit for performing, if the mobile communication terminal exits from the WiBro service area, data communication using a public wireless network and a storage unit for storing data communication related information.

BRIEF DESCRIPTION OF THE DRAWINGS

The above features and advantages of the present invention will be more apparent from the following detailed description in conjunction with the accompanying drawings, in which.

DETAILED DESCRIPTION OF THE INVENTION

According to the present invention, examples of a public wireless network may include Global System for Mobile communications (GSM), Code Division Multiple Access (CDMA), Wideband CDMA (WCDMA), and Universal Mobile Telecommunications System (UMTS) networks.

For purposes of describing the instant invention, the mobile communication terminal utilizing Wireless Application Protocol (WAP) services to connect to a data server through a public wireless network is described. However, it would be recognized that the principles of the invention is applicable to other types of mobile communication services.

In the following description of the present invention, data communication related information refers to information needed by a mobile communication terminal in which data communication was suspended when exiting from a WiBro service area in order to continue data communication when reentering the service area.

Preferably, the data communication related information includes data communication processing rate, the name and address of data, and a portion of the mobile communication terminal in which data has been stored.

Further, it is assumed hereinafter that both a WiBro network and a public wireless network share information related to charging of data communication fees, data transmission, and user authentication.

Figure 1:
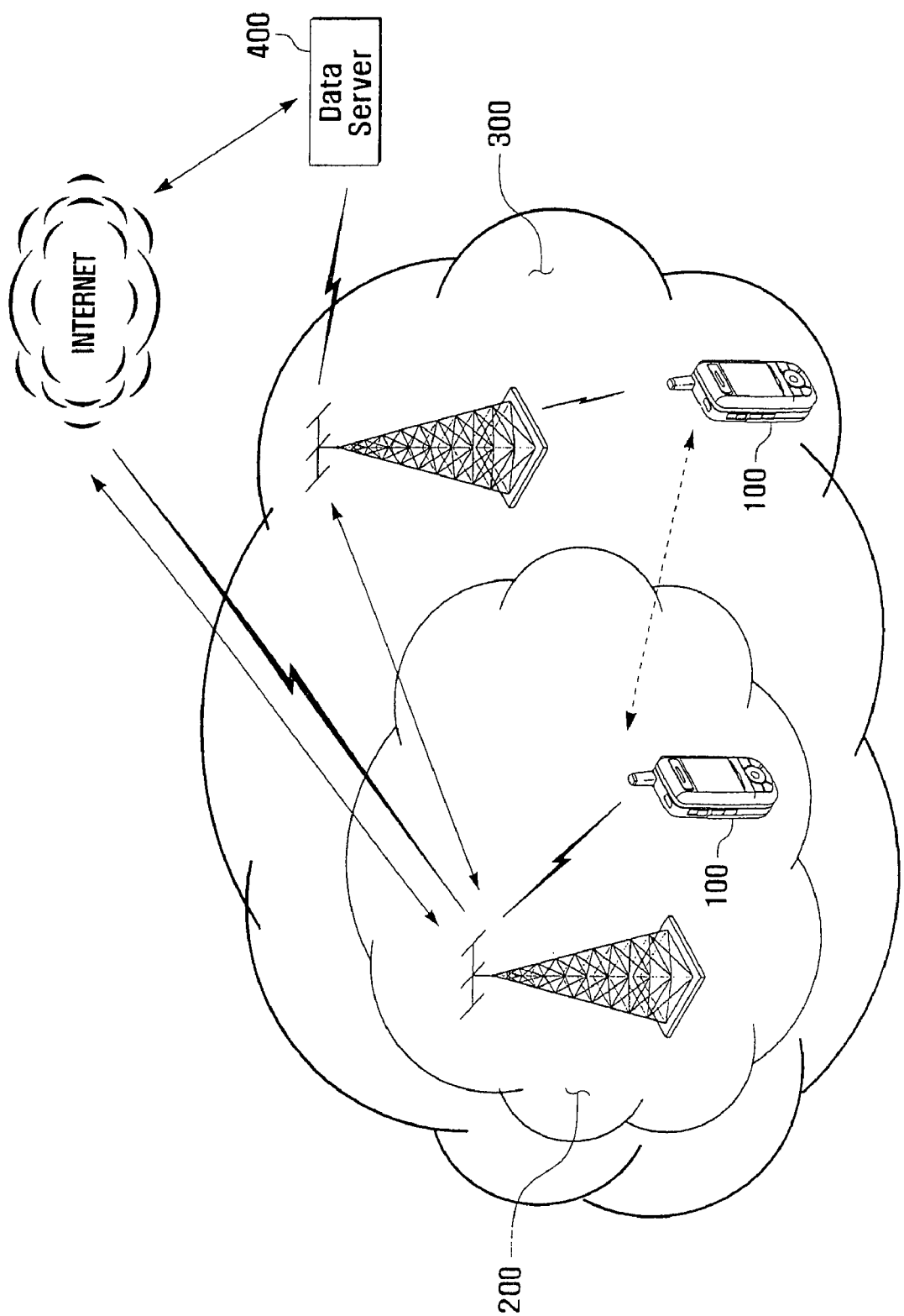
FIG. 1 is a diagram of a communication network system according to an exemplary embodiment of the present invention.

Hereinafter, exemplary embodiments of the present invention are described in detail with reference to the accompanying drawings. FIG. 1 is a diagram of a communication network system according to an exemplary embodiment of the present invention.

The communication network system consists of a mobile communication terminal 100, a WiBro network centered about station 200, a public wireless network centered about station 300, and a data server 400.

The mobile communication terminal 100 senses the strength of a signal received from a WiBro base station to determine whether it has exited from or entered into a WiBro service area.

The mobile communication terminal 100 also connects to the Internet via either or both of a WiBro network 200 and a public wireless network 300 to perform data communication with the data server 400.

To achieve this function, the mobile communication terminal 100 preferably includes a WiBro communication unit and a public wireless communication unit.

If the mobile communication terminal 100 exits from a WiBro service area while performing data communication using the WiBro network 200, it continuously receives the data being communicated through the public wireless network 300.

When the mobile communication terminal 100 exits from the WiBro service area, data communication is suspended. If the mobile communication terminal 100 reenters the WiBro service area, it uses the WiBro network 200 to continue the suspended data communication.

To this end, the mobile communication terminal 100 stores data communication related information.

The WiBro network 200 provides wireless Internet and communication services so that the mobile communication terminal 100 residing within the WiBro service area can access the Internet.

In particular, the WiBro network 200 connects the mobile communication terminal 100 with the data server 400 via the Internet when the mobile communication terminal 100 is within or enters the WiBro service area.

To achieve this function, the WiBro network 200 comprises a WiBro base station 200 upon which WiBro network are substantially centered.

When the mobile communication terminal 100 enters the WiBro service area, the WiBro base station provides WiBro services so that the mobile communication terminal 100 can communicate with the data server 400 through the WiBro network 200.

When the mobile communication terminal 100 exits from the WiBro service area during data communication, the public wireless network 300 allows the mobile communication terminal 100 to communicate with the data server 400 using the Internet.

According to the present invention, examples of the public wireless network 300 may include GSM, CDMA, WCDMA, and UMTS networks.

The data server 400 stores data such as game data, photos, videos, and/or MP3 files and transmits the data to the mobile communication terminal 100.

Figure 2:
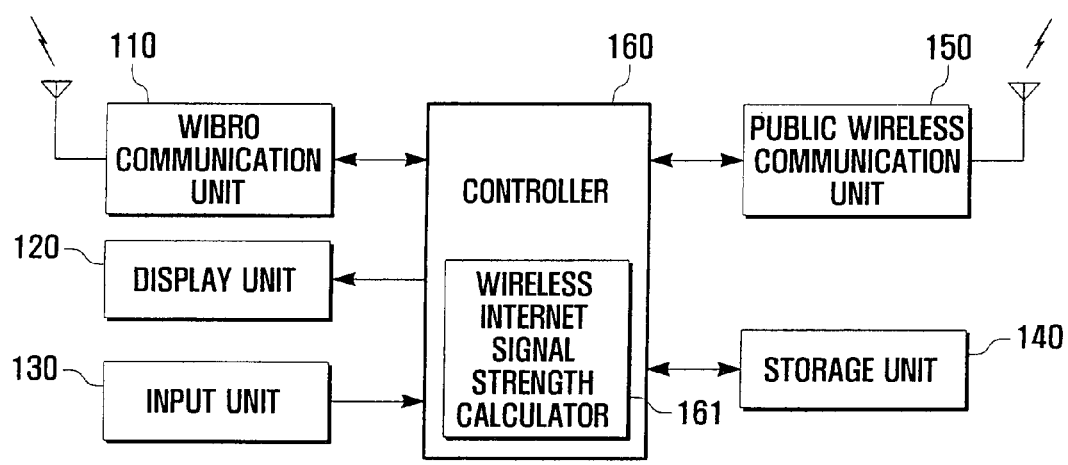
FIG. 2 is a block diagram illustrating a configuration of a mobile communication terminal according to an exemplary embodiment of the present invention.

FIG. 2 is a block diagram illustrating a configuration of the mobile communication terminal 100 according to an exemplary embodiment of the present invention. Referring to FIGS. 1 and 2, the mobile communication terminal 100 includes a WiBro communication unit 110, a display unit 120, an input unit 130, a storage unit 140, a public wireless communication unit 150, and a controller 160.

The WiBro communication unit 110 receives a WiBro signal from a WiBro base station, and transmits a WiBro signal carrying transmission data from the mobile communication terminal 100.

When the mobile communication terminal 100 enters the WiBro service area, the WiBro communication unit 110 also receives data from the data server 400 using the WiBro network 200.

The display unit 120 may be a liquid crystal display (LCD). The display unit 120 displays data generated in the mobile communication terminal 100 as well as the current operation status of the mobile communication terminal 100 on the screen.

In particular, when the mobile communication terminal 100 exits from the WiBro service area, whereby data communication is suspended, and the display unit 120 displays a selection menu that allows the user to select a data communication method.

The selection menu displays a menu item for selecting whether to communicate data using the public wireless network 300 when data communication is suspended or to continue the data communication when the mobile communication terminal 100 subsequently reenters the WiBro service area.

The input unit 130 may be implemented using a touch screen, touch pad, or keypad including various function keys, numeral keys, special keys, and character keys.

The input unit 130 outputs a signal input by a user to control the operation of the mobile communication terminal 100.

In particular, the input unit 130 receives a selection input from the user for selecting a downloading method, and outputs the selection to the controller 160.

The storage unit 140 stores programs and data necessary for the overall operation of the mobile communication terminal 100. In particular, the storage unit 140 stores data communication related data.

The data communication related information, preferably, includes data communication processing rate, address and name of data, and a portion of the mobile communication terminal 100 where data has been stored.

The pubic wireless communication unit 150 includes a radio frequency (RF) transmitter that up-converts a frequency and amplifies a signal being transmitted, and an RF receiver that low-noise amplifies a signal being received and down-converts its frequency.

The frequencies of the signals being transmitted and received may be frequencies in the GSM, CDMA, WCDMA, or UMTS band.

The public wireless communication unit 150 transmits and receives data through the public wireless network 300. In particular, if the mobile communication terminal 100 exits from the WiBro service area while downloading data using the WiBro network 200, the public wireless communication unit 150 continues to receive data being communicated using the public wireless network 300.

The controller 160 controls the overall operation of the mobile communication terminal 100. In particular, the controller 160 includes a wireless Internet signal strength calculator 161 to determine whether the mobile communication terminal 100 exits from or enters the WiBro service area based on the strength of a WiBro signal received by the WiBro communication unit 110.

More specifically, if the strength of the received WiBro signal determined by the wireless Internet signal strength calculator 161 falls below a threshold level, the controller 160 determines that the mobile communication terminal 100 has exited from the WiBro service area. Conversely, if the strength of the WiBro signal is greater than the threshold level, the controller 160 determines that the mobile communication terminal 100 has entered the WiBro service area.

If the controller 160 determines that the mobile communication terminal 100 has exited from the WiBro service area while performing data communication using the WiBro network 200, the controller 160 controls the storage unit 140 to store the data communication related information.

The controller 160 also controls the display unit 120 to display a selection menu that enables the user to select a method to continue downloading of the data that has ceased to be downloaded. The controller 160 then performs continuous communication by seamlessly communicating the data whose communication has been suspended.

The controller 160 also determines whether data that has ceased to be communicated exists within the storage unit 140. Preferably, if the data communication related information is stored within the storage unit 140, the controller 160 determines that the data that has ceased to be communicated exists therein.

Figure 3:
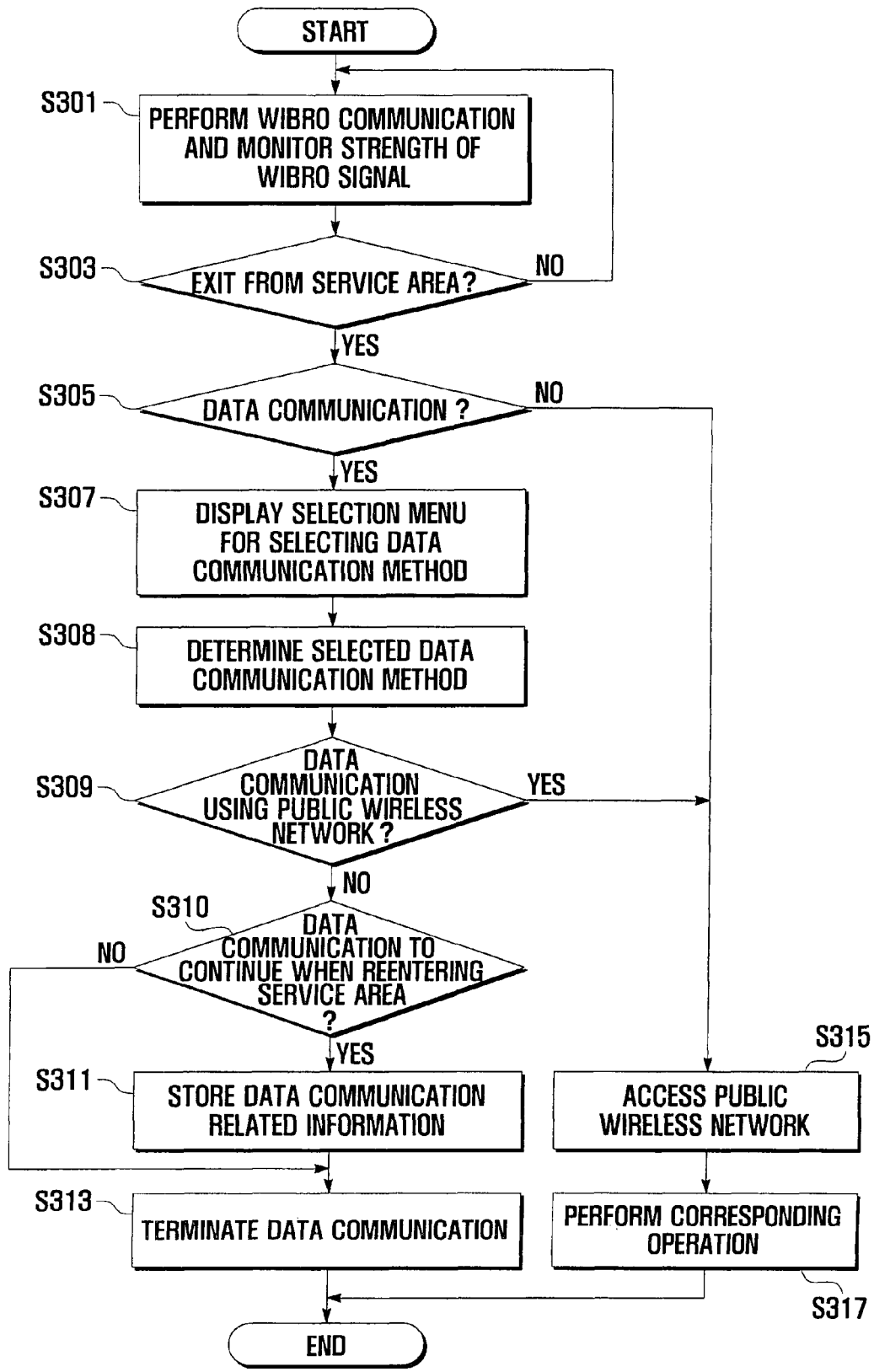
FIG. 3 is a flowchart illustrating an operation of a mobile communication terminal of FIG. 2 when exiting from a WiBro service area according to an exemplary embodiment of the present invention.

FIG. 3 is a flowchart illustrating an operation of the mobile communication terminal 100 when exiting from a WiBro service area according to an exemplary embodiment of the present invention.

Referring to FIGS. 1-3, the controller 160 of the mobile communication terminal performs communication using the WiBro network 200 and monitors the strength of a WiBro signal (S301). The controller 160 then determines whether the mobile communication terminal 100 has exited from the WiBro service area (S303) using the strength of the WiBro signal received through the WiBro communication unit 110.

That is, if the strength of the received WiBro signal falls below a threshold level, the controller 160 determines that the mobile communication terminal 100 has exited from the WiBro service area. Conversely, if the strength of the WiBro signal is greater than or equal to the threshold level, the controller 160 determines that the mobile communication terminal 100 is within the WiBro service area.

If the mobile communication terminal 100 has exited from the WiBro service area at step S303, the controller 160 then determines whether the communication performed at step S301 is data communication (S305).

If the type of the communication is not data communication (for example, if the communication is voice communication or Short Message Service (SMS)), the controller 160 controls the public wireless communication unit 150 to access the public wireless network 300 (S315) and performs a corresponding operation (S317).

If the type of the communication is data communication at step S305, the controller 160 controls the display unit 120 to display a selection menu that allows the user to select a data communication method (S307).

In one aspect, the selection menu includes menu items 'Suspend Data Communication,' 'Communicate Using Public Wireless Network', and 'Communicate Using WiBro Network'.

The 'Suspend Data Communication' menu item enables the user to cease ongoing data communication.

The 'Communicate Using Public Wireless Network' menu item enables the user to continue the data communication that is suspended when the mobile communication terminal 100 exits from the WiBro service area, using the public wireless network 300.

The 'Communicate Using WiBro Network' enables the user to terminate the data communication and to continue the terminated data communication when the mobile communication terminal reenters the WiBro service area.

Thereafter, the controller 160 determines which menu item has been selected from the displayed menu items (S308).

If the 'Communicate Using Public Wireless Network' menu item is selected by the user (S309), the controller 160 accesses the public wireless network 300 using the public wireless communication unit 150 (S315).

The controller 160 then performs an operation corresponding to the selected menu item (for example, data communication using the public wireless network 300) (S317). In this case, Wireless Application Protocol (WAP) services are used to perform data communication using the public wireless network. Data communication fees will be charged for the use of WAP services.

If the 'Communicate Using WiBro Network' menu item is selected by the user (S310), the controller 160 controls the storage unit 140 to store the data communication related information (S311).

The data communication related information is needed to continue data communication when the mobile communication terminal 100 reenters the WiBro service area, after having suspended the data communication when the mobile communication terminal 100 exited from the WiBro service area while performing data communication using the WiBro network 200.

The data communication related information includes data communication processing rate, the name and address of data, and a portion of the mobile communication terminal 100 in which data has been stored.

Thereafter, the controller 160 terminates the data communication procedure (S313).

If the 'Suspend Data Communication' menu item is selected by the user at step S310, the controller 160 terminates the data communication procedure (S313).

As described above, the method for performing data communication according to the present exemplary embodiment enables a user to selectively suspend data communication when a mobile communication terminal exits from a WiBro service area while performing the data communication through a WiBro network, thus resulting in a reduction in data communication costs.

Figure 4:
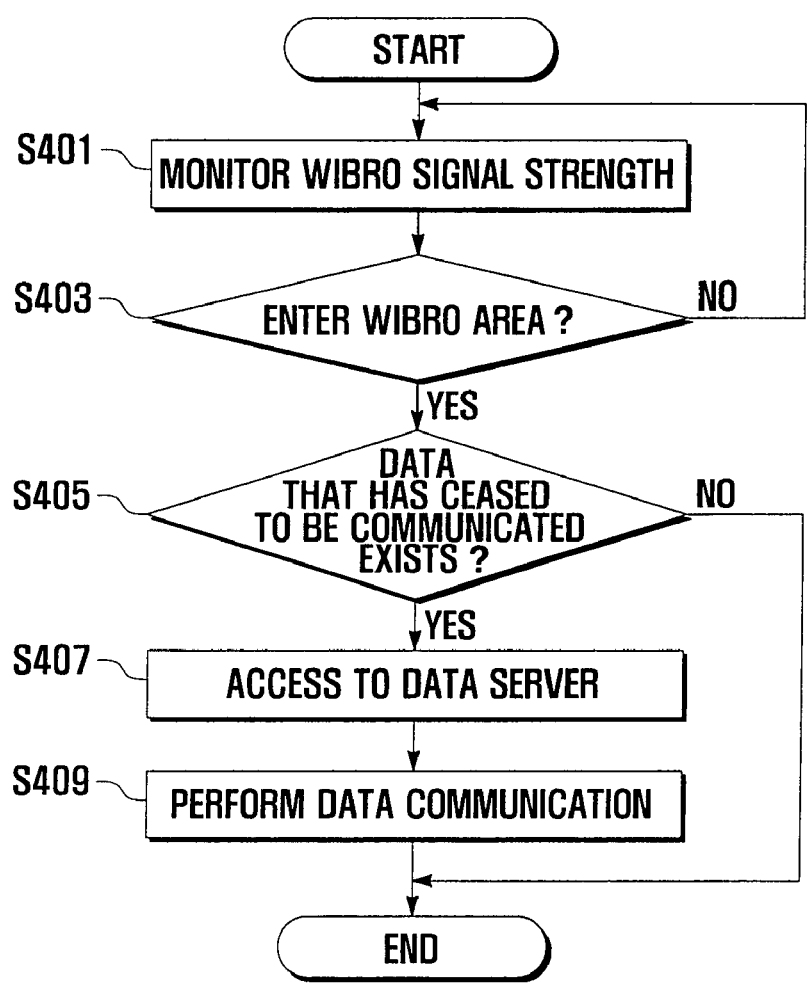
FIG. 4 is a flowchart illustrating an operation of the mobile communication terminal of FIG. 2 when reentering a WiBro service area according to an exemplary embodiment of the present invention.

FIG. 4 is a flowchart illustrating an operation of restarting suspended data communication using a WiBro network in the mobile communication terminal 100 when reentering a WiBro service area, in a method for performing data communication according to an exemplary embodiment of the present invention.

Referring to FIGS. 1-4, while monitoring the strength of a received WiBro signal (S401), the controller 160 determines whether the mobile communication terminal 100 enters the WiBro service area (S403).

If the strength of the WiBro signal is greater than or equal to a threshold level, the controller 160 determines that the mobile communication terminal 100 enters the WiBro service area.

If the mobile communication terminal 100 does not enter the WiBro service area, the controller 160 returns the process flow to step S401 so as to continue monitoring the strength of a WiBro signal.

If the mobile communication terminal 100 enters the WiBro service area at step S403, the controller 160 determines whether data that has ceased to be communicated exists within the storage unit 140 (S405).

Data had ceased to be communicated when the mobile communication terminal 100 exits from the WiBro service area while performing data communication within the WiBro service area.

If data that has ceased to be communicated exists within the storage unit 140 at step S405, the controller 160 is connected to the data server 400 through the WiBro network 200 (S407).

The controller 160 accesses the data server 140 using the data communication related information (for example, server address) stored in the storage unit 140

The controller 160 then searches the data server 400 for the data and continues the suspended data communication using the WiBro network 200 (S409).

The data communication is performed using the data communication related information stored in the storage unit 140 such as the name and address of data and downloading rate.

In another embodiment, if the data that has ceased to be communicated exists within the storage unit 140 at step S405, the controller 160 may control the display unit 120 to display a message (e.g. a pop-up window) asking whether to continue to communicate the data, and may then perform data communication according to the user selection.

As described above, a method and apparatus for performing data communication in a mobile communication terminal according to exemplary embodiments of the present invention enable data communication to be suspended when the mobile communication terminal exits from a WiBro service area while performing the data communication using a WiBro network, thus resulting in a reduction in data communication costs.

The present invention also enables suspended data communication to continue when the mobile communication terminal reenters the WiBro service area.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be rendered in such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

While the present invention has been particularly shown and described with reference to exemplary embodiments thereof, it will be understood by those of ordinary skill in the art that various changes and modifications in form and details may be made without departing from the spirit and scope of the present invention as defined by the following claims.

What is claimed is:

1. A method for performing communication using either a public wireless network or a WiBro in a mobile communication terminal having a WiBro communication unit and a public wireless communication unit, comprising the steps of:
   performing data communication using the WiBro network through the WiBro communication unit in a WiBro service area;
   when exiting the WiBro service area, suspending the data communication and storing data communication related information;
   monitoring whether the mobile communication terminal has reentered the WiBro service area;
   when it is determined that the mobile communication terminal has reentered the WiBro service area, restarting the suspended data communication using the stored data communication related information, wherein
   the data communication related information is at least one of a data communication processing rate, a name and an address of data, and a portion of the mobile communication terminal in which data has been stored.

2. The method of claim 1, further comprising the steps of:
   after exiting the WiBro service area, continuing to perform the data communication using the public wireless network, if a data communication method is to continue data communication using a public wireless network is input.

3. The method of claim 1, wherein the mobile communication terminal is determined to have exited from the WiBro service area when the strength of a received WiBro signal falls below a threshold level.

4. The method of claim 1, further comprising the step of:
   accessing a public wireless network and continuing to perform the communication when the communication is not data communication.

5. A mobile communication terminal having a WiBro function, the terminal comprising:
   a WiBro communication unit for receiving a WiBro signal from a WiBro base station and performing data communication using a WiBro network when the mobile communication terminal enters a WiBro service area;
   a controller for sensing the WiBro signal received from the WiBro communication unit to determine whether the mobile communication terminal exits from or enters the WiBro service area;
   a public wireless communication unit for performing data communication using a public wireless network;
   a storage unit for storing data communication related information; wherein
   the controller:
   controlling the WiBro communication unit to perform data communication when the mobile communication terminal is sensed to be in the WiBro service area;
   when the mobile communication terminal is sensed to exit the WiBro service area, determining to suspend the data communication and controlling the storage unit to store the data communication related information;
   monitoring whether the mobile communication terminal is sensed to reenter the WiBro service area, while; and
   when the mobile communication terminal is sensed to reenter the WiBro service area, controlling the WiBro communication unit to restart the suspended data communication using the stored data communication related information; and
   the data communication related information is at least one of a data communication processing rate, a name and an address of data, and a portion of the mobile communication terminal in which data has been stored.

6. The mobile communication terminal of claim 5, wherein the controller extracts the data communication related information from data being communicated.

7. The mobile communication terminal of claim 5, wherein said terminal is determined to be within a WiBro service area when said received signal strength is above a threshold level.

8. The mobile communication terminal of claim 5, wherein WiBro communication is suspended when said received signal strength is below a threshold level.

9. The mobile communication terminal of claim 5, wherein said controller comprises:

a processor in communication with a memory, the processor executing code stored in said memory.

10. The mobile communication terminal of claim 5, wherein the controller selecting one of the communication units for performing the data communications, and wherein the WiBro communication unit is selected when a received WiBro signal is above a threshold level.

11. The mobile communication terminal of claim 5, wherein the mobile communication terminal further comprising:
- a display device for displaying a selection menu that allows a user to select a data communication method; and
- an input device for providing an input signal responsive to the selection menu to the controller; wherein the input signal indicates a type of networks to be used for the data communication after the mobile communication terminal exits from the WiBro service area;

the controller controls, if the input signal indicates the public wireless network as the type of networks, the public wireless communication unit to continue the data communication after the mobile communication terminal exits the WiBro service area.

* * * * *